(12) United States Patent
Chong et al.

(10) Patent No.: US 6,469,733 B2
(45) Date of Patent: Oct. 22, 2002

(54) APPARATUS AND METHOD FOR VIDEO TRANSMISSION IN VIDEO CONFERENCING SYSTEM

(75) Inventors: Hak-Jin Chong; Soon-Hwa Jang, both of Taejon (KR)

(73) Assignee: Korea Telecom (KR)

( * ) Notice: Subject to any disclaimer, the term of this patent is extended or adjusted under 35 U.S.C. 154(b) by 67 days.

(21) Appl. No.: 09/739,570

(22) Filed: Dec. 15, 2000

(65) Prior Publication Data

US 2002/0024588 A1 Feb. 28, 2002

(51) Int. Cl.[7] ................................................ H04N 7/12
(52) U.S. Cl. .................................. 348/14.08; 348/14.12
(58) Field of Search ................ 348/14.01, 14.08–14.13; 379/93.01, 93.08

(56) References Cited

U.S. PATENT DOCUMENTS

| 5,838,664 A | * 11/1998 | Polomski | .................. 348/14.09 |
| 5,926,208 A | * 7/1999 | Noonen et al. | ........... 348/14.13 |
| 6,297,846 B1 | * 10/2001 | Edanami | .................. 348/14.07 |

* cited by examiner

Primary Examiner—Wing F. Chan
(74) Attorney, Agent, or Firm—Blakely Sokoloff Taylor & Zafman

(57) ABSTRACT

An apparatus and a method for video transmission in a video conferencing system in which in order to efficiently transmit the speaker's picture in meetings, conferences, workshops and the like, the text data is separately transmitted by being separated from the speaker's picture. The apparatus for video transmission in a video conferencing system includes an A/D converter; a scaling part; a filtering and scaling part for filtering to remove noises from a text video data of an external source, and for scaling to expand or reduce its size to a proper one; a difference component extracting part for extracting difference components from the speaking video data and the text video data of the scaling part and the filtering and scaling part; a binary imaging part for setting a first threshold value to the extracted speaker's video data of the difference component extracting part to form a binary image; a filtering part for setting a second threshold value to the binary speaker's image of the binary imaging part, to carry out a filtering so as to assign a relevant region to the speaker's image; a compressing and encoding part for compressingly encoding the speaker's video data of the assigned region of the filtering part; and a first interfacing part for interfacing by connecting a communication network to the speaker's video data of the encoding part and to the text video data from the other external source.

6 Claims, 5 Drawing Sheets

BINARY IMAGING →

FILTERING BASED SIZE OF REGION →

APPARATUS AND METHOD FOR VIDEO TRANSMISSION IN VIDEO CONFERENCING SYSTEM

FIELD OF THE INVENTION

The present invention relates to an apparatus and a method for video transmission in a video conferencing system, and relates to a recording medium readable by a computer having a program for realizing the mentioned apparatus and method.

Particularly, the present invention relates to an apparatus and a method for video transmission in a video conferencing system, and relates to a recording medium readable by a computer having a program for realizing the mentioned apparatus and method, in which in order to efficiently transmit the speaker's picture in meetings, conferences, workshops and the like, the text data is separately transmitted by being separated from the speaker's picture.

DESCRIPTION OF THE PRIOR ART

Recently, the traffic is being more and more complicated, and the communication networks are progressing toward higher levels. In this context, the current demand is that people do not want to go to the conferencing sites, but want to remotely watch the conference. However, the speaker's data consists of a text, and therefore, it is difficult to photograph and transmit the large amount of the speaker's data by a video camera.

That is, in the case where the speaking scene is photographed and is transmitted through a computer network, the speaker's image and the text data picture are mixed together, and under this circumstance, if the speaker moves very much, so much the amount of the information is increased. Accordingly, so much a wider band width is required.

Therefore, it is necessary a method in which the speakers are separated respectively, and the text data is transmitted in a separated form, while the speakers are transmitted in the form of a video data, thereby reducing the band width during the transmission.

SUMMARY OF THE INVENTION

Therefore, it is an object of the present invention to provide an apparatus and a method for video transmission in a video conferencing system, and to provide a computer readable recording medium storing a program for realizing the mentioned apparatus and method, in which in order to efficiently transmit the speaker's picture in meetings, conferences, workshops and the like, the text data is separately transmitted by being separated from the speaker's picture.

In accordance with an aspect of the present invention, there is provided an apparatus for video transmission in a video conferencing system, including: a signal converting part for converting an analogue speaking video data of an external source to a digital speaking data; a scaling part for carrying out a scaling to expand or reduce the speaking video data of the signal converting part to a proper size; a filtering and scaling part for carrying out a filtering to remove noises from a text video data of an external source, and for carrying out a scaling to expand or reduce its size to a proper one; a difference component extracting part for extracting difference components from the speaking video data and the text video data of the scaling part and the filtering and scaling part; a binary imaging part for setting a first threshold value to the extracted speaker's video data of the difference component extracting part to form a binary image; a filtering part for setting a second threshold value to the binary speaker's image of the binary imaging part, to carry out a filtering so as to assign a relevant region to the speaker's image; an encoding part for compressingly encoding the speaker's video data of the assigned region of the filtering part; and a first interfacing part for carrying out an interfacing by connecting a communication network to the speaker's video data of the encoding part and to the text video data from another external source.

The apparatus of the present invention further includes: a second interfacing part for receiving the speaker's video data and the text video data by connecting them to the communication network; a decoding part for decoding the compressingly encoded speaker's video data of the second interfacing part; and a mixing part for mixing together the decoded speaker's video data of the decoding part and the text video data of the second interfacing part.

In accordance with another aspect of the present invention, there is provided a method for video transmission in a video conferencing system according to the present invention, including the steps of: a) converting an analogue speaking video data of an external source to a digital speaking data; b) carrying out a scaling to expand or reduce the converted speaking video data to a proper size; c) carrying out a filtering to remove noises from a text video data of an external source, and carrying out a scaling to expand or reduce its size to a proper one; d) extracting difference components from the scaled speaking video data and the text video data of the second and third steps; e) setting a first threshold value to the extracted speaker's video data to form a binary image; f) setting a second threshold value to the binary speaker's image to carry out a filtering so as to assign a relevant region to the speaker's image; g) and compressingly encoding the speaker's video data of the assigned region, and carrying out an interfacing by connecting a communication network to the speaker's video data and to the text video data from another external source. The method of the present invention further includes the steps of: receiving the speaker's video data and the text video data by connecting them to the communication network; decoding the received speaker's video data; and mixing together the decoded speaker's video data and the received text video data.

In accordance with still another aspect of the present invention, there is provided a computer readable recording medium storing a program for executing a method for video transmission in a video conferencing system, the method comprising the steps of: a) converting an analogue speaking video data of an external source to a digital speaking data; b) carrying out a scaling to expand or reduce the converted speaking video data to a proper size; c) carrying out a filtering to remove noises from a text video data of an external source, and carrying out a scaling to expand or reduce its size to a proper one; d) extracting difference components from the scaled speaking video data and the text video data of the second and third functions; e) setting a first threshold value to the extracted speaker's video data to form a binary image; f) setting a second threshold value to the binary speaker's image to carry out a filtering so as to assign a relevant region to the speaker's image; and g) compressingly encoding the speaker's video data of the assigned region, and carrying out an interfacing by connecting a communication network to the speaker's video data and to the text video data from another external source.

BRIEF DESCRIPTION OF THE DRAWINGS

The above object and other advantages of the present invention will become more apparent by describing in detail with preferred embodiment of the present invention with reference to the attached drawings in which.

DETAILED DESCRIPTION OF THE PREFERRED EMBODIMENT

The preferred embodiment of the present invention will be described referring to the attached drawings.

Figure 1:
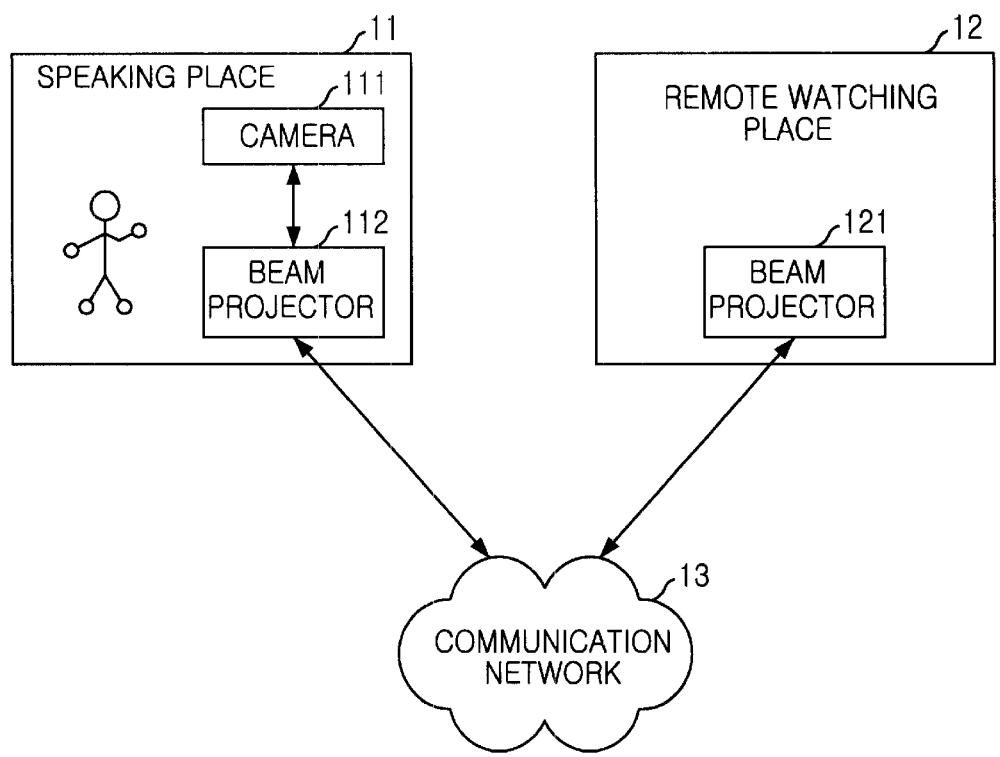
FIG. 1 illustrates the constitution of a video conferencing system to which the present invention is applied.

FIG. 1 illustrates the constitution of a video conferencing system to which the present invention is applied.

As shown in FIG. 1, in the a video conferencing system to which the present invention is applied, the speaker is positioned near the speaking picture, and here, the speaking picture is projected by a beam projector 112 of a computer.

Accordingly, the speaking picture can be obtained within the computer. In order to transmit the speaking picture to a remote watchers' place 12, the image is photographed at a certain distance separated from the speaker. The speaking picture is transmitted through the internet to a remote watchers' place, while the transmitted speaking picture is projected by another beam projector 121 at the remote watchers' place 12. Now the speaker has to be transmitted, but the speaker and the speaking picture are mixed together in the photographed image, and therefore, only the speaker is separated before being transmitted. Here, the transmitted data is projected by the beam projector at the remote watchers' place. Under this condition, the image of the speaker is outputted by being mixed together with the text image.

That is, if the image which is photographed by a TV camera is called 'speaking image', and if the image which has been inputted into the computer and is projected by the beam projector is called 'text image', then the image of the speaker and the text image are mixed together in the speaking image. The method of removing only the text image portion from the speaking image, and of leaving only the speaker will be described below referring to FIG. 2.

Figure 2:
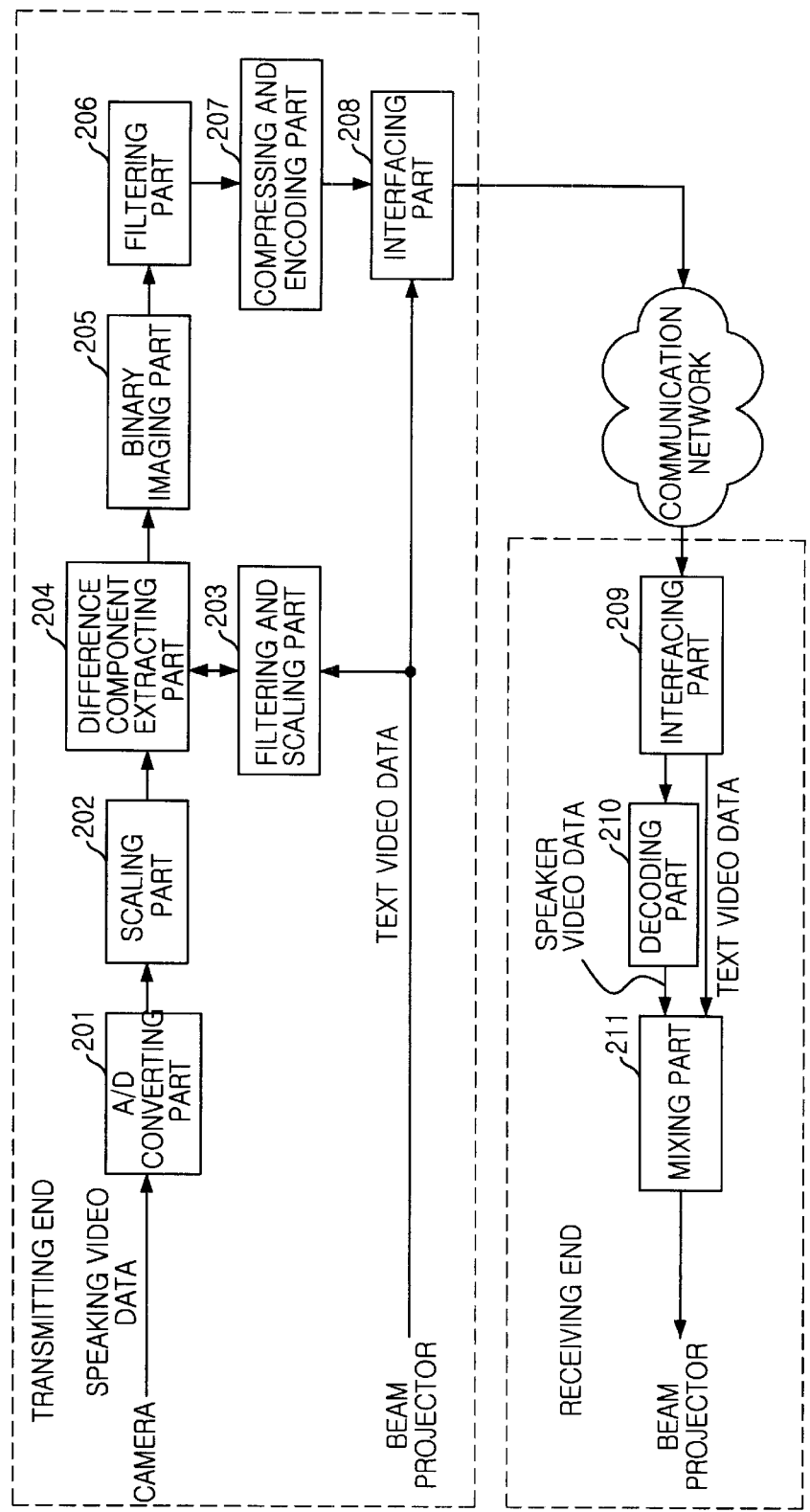
FIG. 2 is a block diagram showing the constitution of the video transmission apparatus for a video conference according to the present invention.

FIG. 2 is a block diagram showing the constitution of the video transmission apparatus for a video conference according to the present invention.

As shown in FIG. 2, the text image data has been stored in the computer, and is outputted through the beam projector to interfacing parts 208 and 209 which will be described later.

The apparatus for video transmission in a video conferencing system according to the present invention includes: an A/D (analogue/digital) converting part 201 for converting an analogue speaking video data of a TV camera to a digital speaking data; a scaling part 202 for carrying out a scaling to expand or reduce the speaking video data of the A/D converting part 201 to a proper size; a filtering and scaling part 203 for carrying out a filtering to remove noises from a text video data of an external source, and for carrying out a scaling to expand or reduce its size to a proper one; a difference component extracting part 204 for extracting difference components from the speaking video data and the text video data of the scaling part 202 and the filtering and scaling part 203; a binary imaging part 205 for setting a first threshold value to the extracted speaker's video data of the difference component extracting part 204 to form a binary image; a filtering part 206 for setting a second threshold value to the binary speaker's image of the binary imaging part 205 to carry out a filtering so as to assign a relevant region to the speaker's image; a compressing and encoding part 207 for compressingly encoding the speaker's video data of the assigned region of the filtering part 206; and a first interfacing part 208 for carrying out an interfacing by connecting a communication network to the speaker's video data of the compressing and encoding part 207 and to the text video data from the beam projector.

The apparatus of the present invention further includes: a second interfacing part 209 for receiving the speaker's video data and the text video data by connecting them to the communication network; a decoding part 210 for decoding the compressingly encoded speaker's video data of the second interfacing part 209; and a mixing part 211 for mixing together the decoded speaker's video data of the decoding part 210 and the text video data of the second interfacing part 209.

Now the apparatus of the present invention constituted as above will be described as to its operations.

First, the text video data has been stored in the computer, and is outputted through the beam projector.

Meanwhile, the speaking video data which has been photographed by the TV camera is subjected to an A/D conversion, and the converted speaking video data is scaled to a proper size.

The reason is as follows. That is, the positions of the camera, the speaking picture and the projector can be moved, and therefore, the picture should be maintained at the same size as that of the screen after the conversion. If this task is carried out once before the start of the speaking, the setting needs not be readjusted again as long as the facilities are not moved.

Meanwhile, the text video data is obtained in the form of an image separately from that which is outputted through the beam projector to the interface part 208, and then, the text video data is subjected to a filtering and an expansion/reduction. Usually, the number of pixels of the text video data is larger than that of the speaking video data which is obtained from the camera (the speaking video data from the camera being usually 720×480, and the text video data being usually 800×600, 1024×768 or the like). Therefore, the size of the text video data needs be properly reduced.

Thus when the two video data have undergone the expansion/reduction procedure, the two video data becomes same except the background scene (the background scene is handled as being same as the speaker. However, in actual, there are noises coming from the camera, and there are errors which have occurred during the expansion/reduction. Therefore, the two video data are not exactly same.

Then if the difference between the two video data is obtained, it is the difference portion between the two video data. Ideally, only the image of the speaker remains, but for the above described reason, the components due to the non-correspondence within the speaking picture are extracted rather than the noises.

Figure 3:
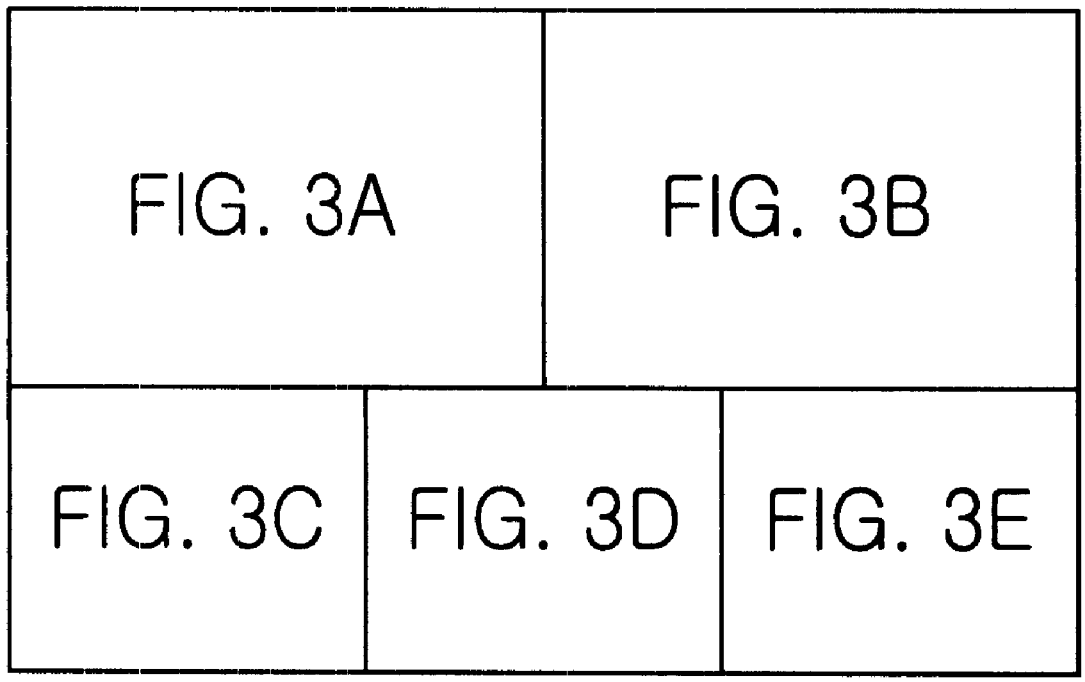
FIG. 3 illustrates the video transmission apparatus for the video conference according to the present invention.
Figure 3B:
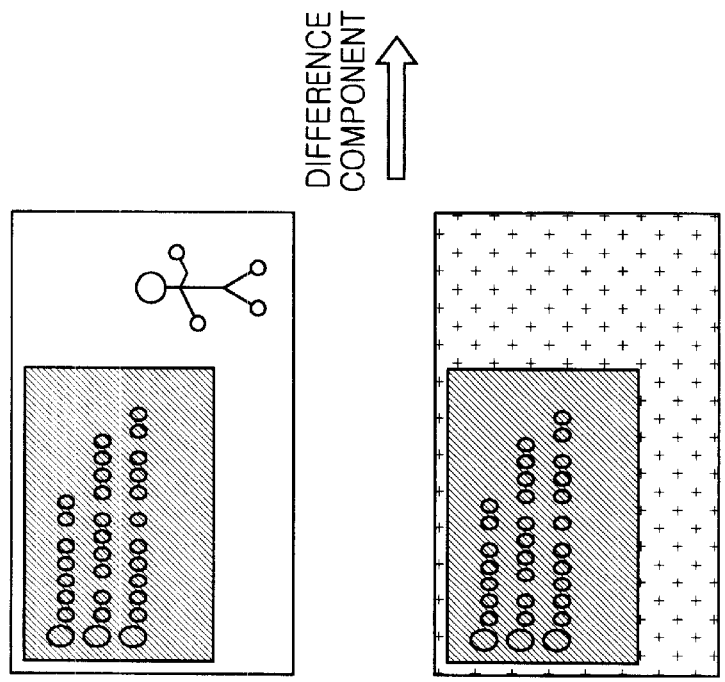
Figure 3A:
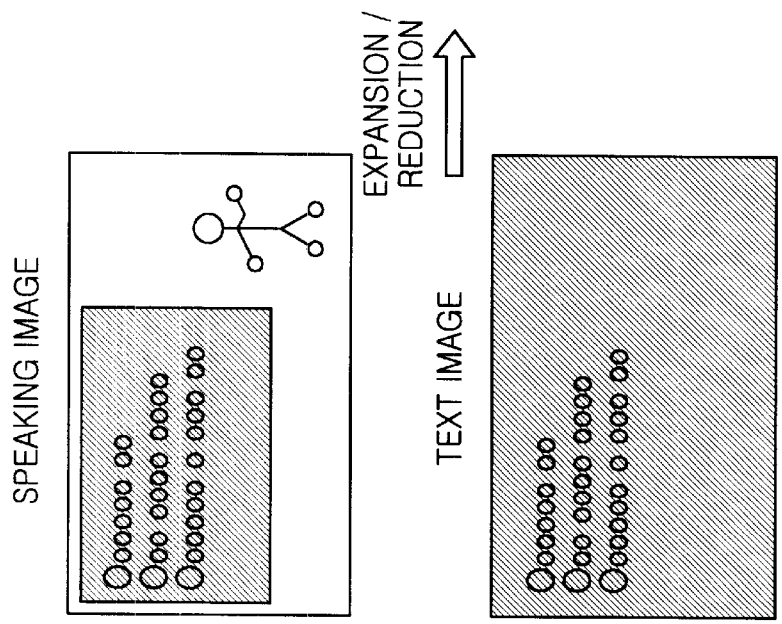
Figure 3C:
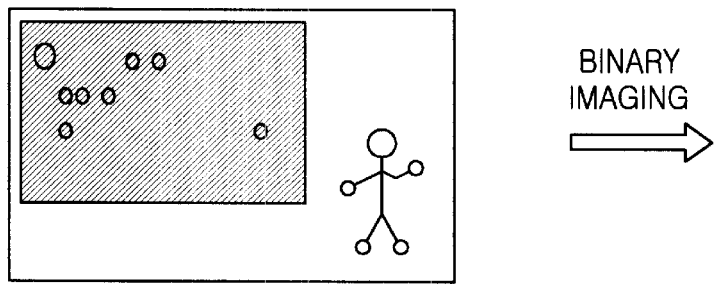
Figure 3D:
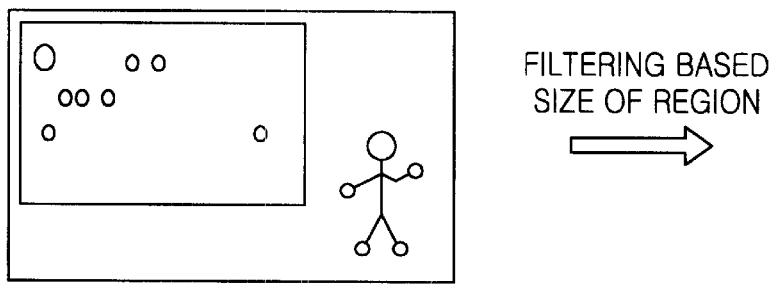

Accordingly, threshold values are set to the components due to the non-correspondence within the speaking picture, and then, a binary image as shown in FIG. 3d is obtained such that if the speaker image extraction value is smaller than the threshold value, it becomes "0", and if it is larger than the threshold value, then it becomes "1". The region corresponding to the speaker's picture appears differently depending on the situation, but it appears as a relatively large region, and for the rest, small regions appear due to the noises and error components.

Figure 3E:
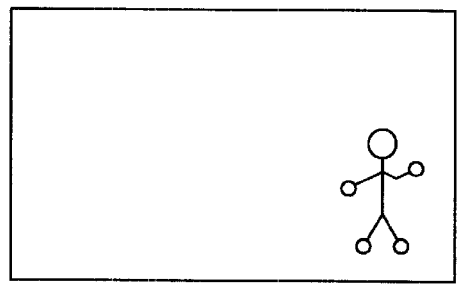

Then a threshold value is calculated for the area in which the value "1" can be maintained around the speaker's picture. In the binary image of FIG. 3d, if the area which can maintain the value "1" is smaller than the threshold value, then it becomes "0", while if it is larger, then it is made to remain as "1". Then the image consisting of the remaining value "1" becomes the region which corresponds to the speaker's picture (refer to FIG. 3e). If this speaker's picture is compressed and transmitted through the communication network to the receiving terminal, then the receiving terminal receives the picture and restores it. Then this picture data is mixed with the separately received text data image so as to project the mixture through the beam projector to the screen.

In the above, the present invention was described based on the specific preferred embodiment and the attached drawings, but it should be apparent to those ordinarily skilled in the art that various changes and modifications can be added without departing from the spirit and scope of the present invention which will be defined in the appended claims.

According to the present invention as described above, when the speaking scenes in a video conference are transmitted through a computer network, the text video data is transmitted separately from the speaker video data, and therefore, the band width can be greatly reduced.

What is claimed is:

1. An apparatus for video transmission in a video conferencing system, comprising:
    a signal converting means for converting an analogue speaking video data of an external source to a digital speaking data;
    a scaling means for carrying out a scaling to expand or reduce the speaking video data of the signal converting means to a proper size;
    a filtering and scaling means for carrying out a filtering to remove noises from a text video data of an external source, and for carrying out a scaling to expand or reduce its size to a proper one;
    a difference component extracting means for extracting difference components from the speaking video data and the text video data of the scaling means and the filtering and scaling means;
    a binary imaging means for setting a first threshold value to the extracted speaker's video data of the difference component extracting means to form a binary image;
    a filtering means for setting a second threshold value to the binary speaker's image of the binary imaging means, to carry out a filtering so as to assign a relevant region to the speaker's image;
    an encoding means for compressingly encoding the speaker's video data of the assigned region of the filtering means; and
    a first interfacing means for carrying out an interfacing by connecting a communication network to the speaker's video data of the encoding means and to the text video data from the other external source.

2. The apparatus as recited in claim 1, further comprising:
    a second interfacing means for receiving the speaker's video data and the text video data by connecting them to the communication network;
    a decoding means for decoding the compressingly encoded speaker's video data of the second interfacing means; and
    a mixing means for mixing together the decoded speaker's video data of the decoding means and the text video data of the second interfacing means.

3. A method for video transmission in a video conferencing system, comprising the steps of:
    a) converting an analogue speaking video data of an external source to a digital speaking data;
    b) carrying out a scaling to expand or reduce the converted speaking video data to a proper size;
    c) carrying out a filtering to remove noises from a text video data of an external source, and carrying out a scaling to expand or reduce its size to a proper one;
    d) extracting difference components from the scaled speaking video data and the text video data of the steps b) and c);
    e) setting a first threshold value to the extracted speaker's video data to form a binary image;
    f) setting a second threshold value to the binary speaker's image to carry out a filtering so as to assign a relevant region to the speaker's image; and
    g) compressingly encoding the speaker's video data of the assigned region, and carrying out an interfacing by connecting a communication network to the speaker's video data and to the text video data from another external source.

4. The method as claimed in claim 3, further comprising the steps of:
    h) receiving the speaker's video data and the text video data by connecting them to the communication network;
    i) decoding the received speaker's video data; and
    j) mixing together the decoded speaker's video data and the received text video data.

5. A computer readable recording medium storing a program for executing a method for video transmission in a video conferencing system, the method comprising the steps of:
    a) converting an analogue speaking video data of an external source to a digital speaking data;
    b) carrying out a scaling to expand or reduce the converted speaking video data to a proper size;
    c) carrying out a filtering to remove noises from a text video data of an external source, and carrying out a scaling to expand or reduce its size to a proper one;
    d) extracting difference components from the scaled speaking video data and the text video data of the second and third functions;
    e) setting a first threshold value to the extracted speaker's video data to form a binary image;
    f) setting a second threshold value to the binary speaker's image to carry out a filtering so as to assign a relevant region to the speaker's image; and
    g) compressingly encoding the speaker's video data of the assigned region, and carrying out an interfacing by connecting a communication network to the speaker's video data and to the text video data from another external source.

6. The recording medium as claimed in claim 5, further comprising the steps of:
    h) receiving the speaker's video data and the text video data by connecting them to the communication network;
    i) decoding the received speaker's video data; and
    j) mixing together the decoded speaker's video data and the received text video data.

* * * * *